United States Patent
Leijten et al.

(10) Patent No.: US 8,145,888 B2
(45) Date of Patent: Mar. 27, 2012

(54) DATA PROCESSING CIRCUIT WITH A PLURALITY OF INSTRUCTION MODES, METHOD OF OPERATING SUCH A DATA CIRCUIT AND SCHEDULING METHOD FOR SUCH A DATA CIRCUIT

(75) Inventors: Jeroen Anton Johan Leijten, Hulsel (NL); Hendrik Tjeerd Joannes Zwartenkot, Eindhoven (NL)

(73) Assignee: Silicon Hive B.V., Eindhoven (NL)

( * ) Notice: Subject to any disclaimer, the term of this patent is extended or adjusted under 35 U.S.C. 154(b) by 382 days.

(21) Appl. No.: 12/440,205

(22) PCT Filed: Sep. 6, 2007

(86) PCT No.: PCT/NL2007/050434
§ 371 (c)(1),
(2), (4) Date: Jul. 15, 2009

(87) PCT Pub. No.: WO2008/030093
PCT Pub. Date: Mar. 13, 2008

(65) Prior Publication Data
US 2010/0185835 A1   Jul. 22, 2010

(30) Foreign Application Priority Data
Sep. 6, 2006   (EP) .................................. 06120236

(51) Int. Cl.
*G06F 9/30* (2006.01)
(52) U.S. Cl. ............... 712/229; 712/43; 712/24; 712/35
(58) Field of Classification Search ............ 712/24, 712/35, 43, 211, 229, 243
See application file for complete search history.

(56) References Cited

U.S. PATENT DOCUMENTS
2002/0116436 A1   8/2002   Whitton

FOREIGN PATENT DOCUMENTS
EP   1 065 586 A2   1/2001
WO   WO 99/14669 A1   3/1999
WO   WO 02/29562 A2   4/2002

OTHER PUBLICATIONS
Lee, Programmable DSP Architectures:Part II; IEEE Acoustiics, Speech, and Signal Processing Magazine, vol. 6, No. 1 (Jan. 1989) pp. 4-14. International Search Report for PCT/NL2007/050434 dated Mar. 7, 2008.

*Primary Examiner* — William M Treat
(74) *Attorney, Agent, or Firm* — Leydig, Voit & Mayer Ltd.

(57) ABSTRACT

A data processing circuit has an execution circuit (18) with a plurality of functional units (20). An instruction decoder (17) is operable in a first and a second instruction mode. In the first instruction mode instructions have respective fields for controlling each of the functional units (20), and in the second instruction mode instructions control one functional unit. A mode control circuit (12) controls the selection of the instruction modes. In an embodiment, the instruction decoder uses time-stationary decoding of the selection of operations to be executed by the execution circuit (18) and the selection of destination registers from the set of registers (19). Mode switching is a more efficient way of reducing instruction time for time stationary processors than indicating functional units for which the instruction contains commands. When instructions are scheduled, constraints are preferably imposed on operations for which operation selection and destination register selection are included on different sides of an instruction mode change. Such operations are avoided in an embodiment. In another embodiment, selected operations are scheduled for which operation selection and destination register selection are included on different sides of an instruction mode change. When an instruction containing a jump is encountered, the mode control circuit sets the instruction mode for subsequent instructions in conformity with information provided by the execution of the jump command.

16 Claims, 7 Drawing Sheets

DATA PROCESSING CIRCUIT WITH A PLURALITY OF INSTRUCTION MODES, METHOD OF OPERATING SUCH A DATA CIRCUIT AND SCHEDULING METHOD FOR SUCH A DATA CIRCUIT

FIELD OF THE INVENTION

The invention relates to a data processing circuit and to a data processing method.

BACKGROUND

US patent application No 2002042909 discloses the use of a retargetable compiler for performing different parts of a program using different instruction sets for a plurality of functional units in a VLIW data processor. The program is compiled into machine instructions that specify an operation to be executed, like addition, shifting, etc, of source registers from which operands for the operation must be loaded and a destination register where the results of the operation must be stored.

Different instruction sets are used that provide different degrees of control over the functional units. A first instruction set allows instructions to control parallel operation independently by means of a plurality of functional units. A second instruction set allows only operation of only one functional unit to be controlled by each instruction. Comparing the first and second instruction set, the first instruction set has the advantage that it generally takes less time to execute a task when the task is coded in instructions for the first instruction mode and the second instruction mode has the advantage that generally less memory is needed to store a program for performing a task.

The compiler is provided with a program and hardware instructions corresponding to the different instruction sets. The compiler selects instruction sets for different program parts, using the first instruction set for inner loops, for example, and the second instruction set for program parts outside inner loops. Next, the compiler compiles the program parts into programs of machine instructions from the selected instruction sets.

The data processing circuit that is used to execute the program is configured to be switchable between different instruction modes, corresponding to the different instruction sets for the plurality of respective functional units. When operating in an instruction mode, the data processing circuit interprets instructions supplied to the data processing circuit as instructions from the instruction set that corresponds to the current instruction mode. US patent application No 2002042909 is not concerned with how switching between instruction modes is performed, but refers to U.S. Pat. No. 5,933,642 which uses dedicated reconfiguration instructions for this purpose.

This method of executing a program limits the optimization of the combination of execution speed and program size. Furthermore, the use of special reconfiguration instructions expands the instruction set.

SUMMARY OF THE INVENTION

In one aspect of the invention, it is an object to provide an instruction mode switching without the use of special instructions.

In another aspect, it is an object to provide an improvement of the optimization of the combination of execution speed and program size.

It is a further object to provide a data processing circuit that renders it possible to improve the optimization of the combination of execution speed and program size.

According to a first aspect, a data processing circuit according to claim 1 is provided. Jump commands in the instruction are used herein to affect switches between different instruction modes, the instructions controlling more and fewer functional units. Thus no dedicated mode switching instruction is needed for this purpose. Information about the mode may be provided in the jump target address, for example as a number of most significant bits of that address. The jump target address may be specified literally in the jump instruction. In another embodiment, the jump target address may be provided from an operand register of the jump command, a number of most significant bits from this operand register being used to select the mode for subsequent instructions.

In a further embodiment, the instructions in the different modes have mutually different lengths. This means that differently sized parts of the instruction address provide resolution below the minimum instruction increment of instruction addresses in different instruction modes. In an embodiment, program counter values are translated into instruction memory addresses by mode-dependent shifting, e.g. by two bits in a four-byte instruction mode and by one bit in a two-byte instruction mode. Thus a mode-independent program counter increment can be used and no instruction address bits are lost to redundant address resolution. In another embodiment, instruction mode dependent increments are used. In a further embodiment, a comparator may be used to determine after each program counter increment in an instruction mode with shorter instructions whether a new fetch from memory is needed or whether the newly addressed instruction has already been fetched together with an earlier instruction in a larger fetch word.

In another aspect, different instruction modes are used for a data processor that uses time stationary decoding of operation selection and result register address selection. Time stationary instruction encoding and decoding is known per se. It can be contrasted with the more usual data stationary encoding and decoding, wherein each instruction contains both the selection of an operation and the selection of a result register address for that operation. This has the effect that the result register address must be kept, for example in a pipeline, until the operation generates the result. In time stationary instruction encoding and decoding, by contrast, the selection of an operation and the addressing of a result register for the operation are included in different instructions that are executed at the time when the operation is started and at the time when the data processor has generated the result of the operation, respectively. Each instruction thus contains fields for operation selection and result register addressing, but relating to different operations, in time stationary instruction encoding. The field for result register addressing is used for the result that is available from a functional unit at the time of execution of the instruction, as a result of an operation selected by an earlier executed instruction.

In a data processor that uses time stationary instruction decoding, the use of different instruction modes has the advantage that it is more efficient than other methods of compressing program size. Conventional compression methods used for data stationary VLIW processors, for example, use an indication of the functional units for which commands are included in an instruction. The number of indications would increase significantly in a time stationary processor. The use of switching between different instruction modes reduces this overhead, because the number of registers that can be addressed does not have to be indicated in each instruction. Thus, for example, result register addresses for results from a plurality of functional units can be included in each instruction in a first instruction mode for a plurality of functional units, whereas in a second instruction mode only one result register address may be included.

In an embodiment, mode-switching commands may have latency, which is the case, for example, when jump instructions are used for this purpose. In this case there is a delay between the start of execution of the mode switch command and the actual mode switch. This delay may be used to add instructions with additional result register addresses behind the mode switching commands. In an embodiment, it is avoided that operations are selected so late before a mode switch that the data processor generates their results after the mode switch. Thus the result or results can be written under the control of an instruction in the same instruction mode that was used to select the operation, using instructions that provide a same number of operations and result register selections, for example. This simplifies program sequencing. In another embodiment, different instruction modes are used for a first instruction wherein an operation is selected and a second instruction wherein a register is addressed for writing its result. This renders it possible to use the data processor more efficiently, because it reduces constraints on scheduling operations near switches between instruction modes. It may be applied, for example, when a jump instruction is used to switch between instruction modes, and the target of the jump can only be reached via the jump. In this case no ambiguity exists in the source of the result. However, in a more complex embodiment it may also be applied when different paths exist to the target, when operations are selected to produce the result in each of the paths. In another embodiment, it may be used to write a result of a subroutine (a subprogram of a series of instructions) that can be called from different points in a program. Thus no predetermined register for all returns from the subroutine needs to be reserved for the result.

In another aspect, a scheduling method is provided for scheduling instructions for this type of data processor. Scheduling of single mode processors and data stationary processors is known per se. Typically, a program is first compiled from a high-level language program into machine operations of the processor. During scheduling the sequence for (parallel) execution of the operations is selected, so as to optimize processor efficiency. Instructions for executing the operations are then programmed into the instruction memory with operation selection codes located in the instructions in accordance with the result of the scheduling (programming may include manufacturing with a mask set that results in the required instructions, or programming into a non-volatile memory or even into a volatile memory, for example). In the case of a time stationary processor with multiple instruction modes, scheduling also involves inserting mode change commands into instructions and locating result register addresses in instructions at offsets to instructions that contain selections of the corresponding operations. Scheduling constraints may be imposed in various embodiments in order to ensure that result register addresses can be conveyed in the same instruction mode as the selection of operations that produce the results, otherwise operations may be selected for which result register addresses and selection of operations that produce the results are included in instructions executed in different modes. In the latter case the number of operation selections that are scheduled may be adapted to capacity to select destination registers after the instruction mode switch. That is, fewer operation selections may be scheduled close to the mode switch if the capacity decreases and more if the capacity increases.

BRIEF DESCRIPTION OF THE DRAWINGS

These and other objects and advantageous aspects will become apparent from a description of exemplary embodiments given with reference to the following figures.

DETAILED DESCRIPTION OF THE DRAWINGS

Figure 1:
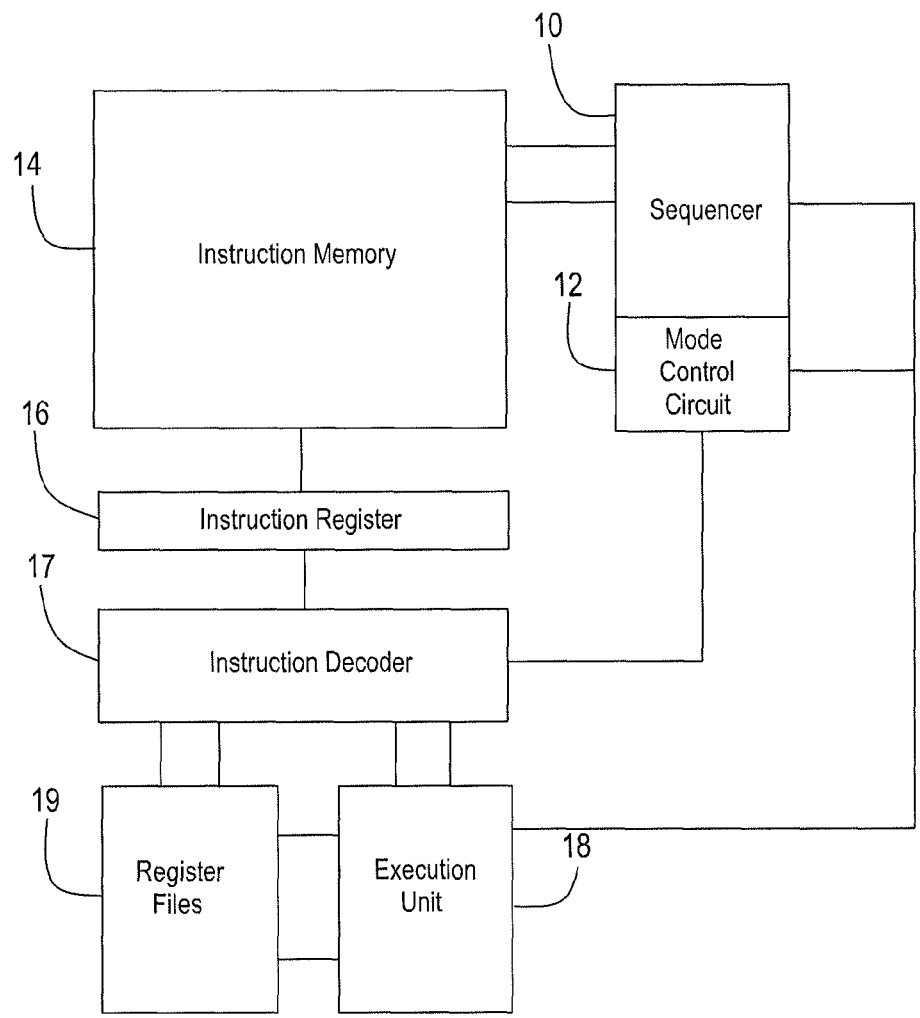
FIG. 1 shows a data processing circuit.

FIG. 1 shows a data processing circuit. The circuit contains a sequencer 10, a mode control circuit 12, an instruction memory 14, an instruction register 16, an instruction decoder 17, an execution unit 18, and a set of register files 19 (i.e. one or more register files). Sequencer 10 has an output for supplying a program counter address, coupled to an input of instruction memory 14. Instruction memory 14 has an output coupled to instruction register 16. Instruction register 16 has an output coupled to instruction decoder 17, which has outputs coupled to execution unit 18 and set of register files 19. Execution unit 18 has operand inputs and result outputs coupled to read ports and write ports of set of register files 19 and a jump control output coupled to sequencer 10. Mode control circuit 12 has an output coupled to a control input of instruction decoder 17.

In operation, sequencer 10 maintains a program counter value, normally incrementing the program counter value in successive instruction cycles and changing the program counter value according to a successful jump instruction when such a jump instruction is executed by execution unit 18. Sequencer 10 supplies a signal to mode control circuit 12 to control instruction mode selection.

At least part of the program counter value is used to address instructions in instruction memory 14. Instruction memory 14 retrieves the addressed instructions and supplies them to instruction register 16, where instructions are stored for controlling execution. Although a simple memory may be used to implement instruction memory 14, it should be appreciated that instruction memory 14 may also be implemented as a hierarchical memory circuit, containing any number of levels of caches to store instructions that are expected to be used.

Instruction register 16 supplies instructions to instruction decoder 17 successively. Mode control circuit 12 supplies a mode control signal to instruction decoder 17. Instruction decoder 17 generates execution control signals for execution unit 18 and set of register files 19.

Figure 2:
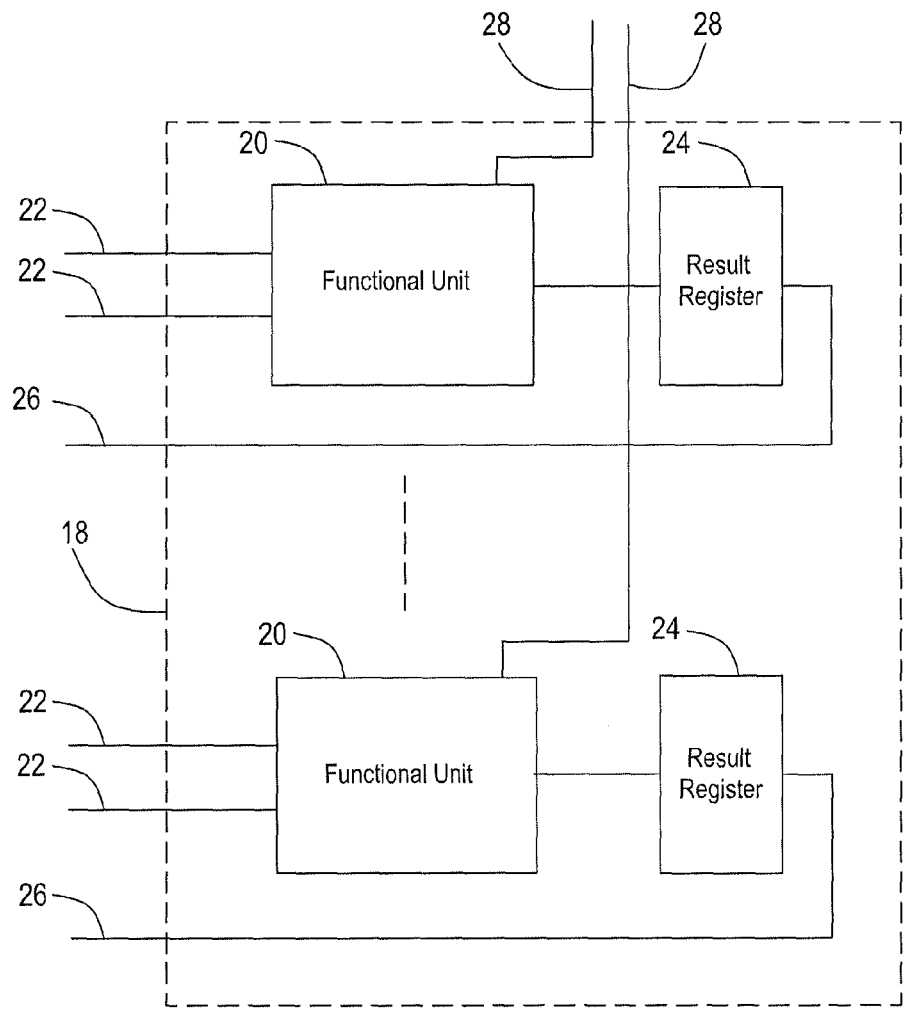
FIGS. 2, 2a show an execution unit.

FIG. 2 shows an embodiment of an execution unit 18. In this embodiment, execution unit 18 is a circuit that comprises a plurality of groups of functional units 20, each comprising at least one functional unit, with operand inputs 22 coupled to read ports of one or more register files (not shown), result registers 24 with inputs coupled to the groups of functional units 20, and outputs 26 coupled to write ports of one or more register files (not shown). Each group of functional units 20 has a control input 28 coupled to the instruction decoder (not shown). In a further embodiment, internal registers (not shown) may be provided in functional unit groups, coupled to execution circuits to allow results of a functional unit to be passed internally as operands for another functional unit under the control of an operation code.

Figure 2A:
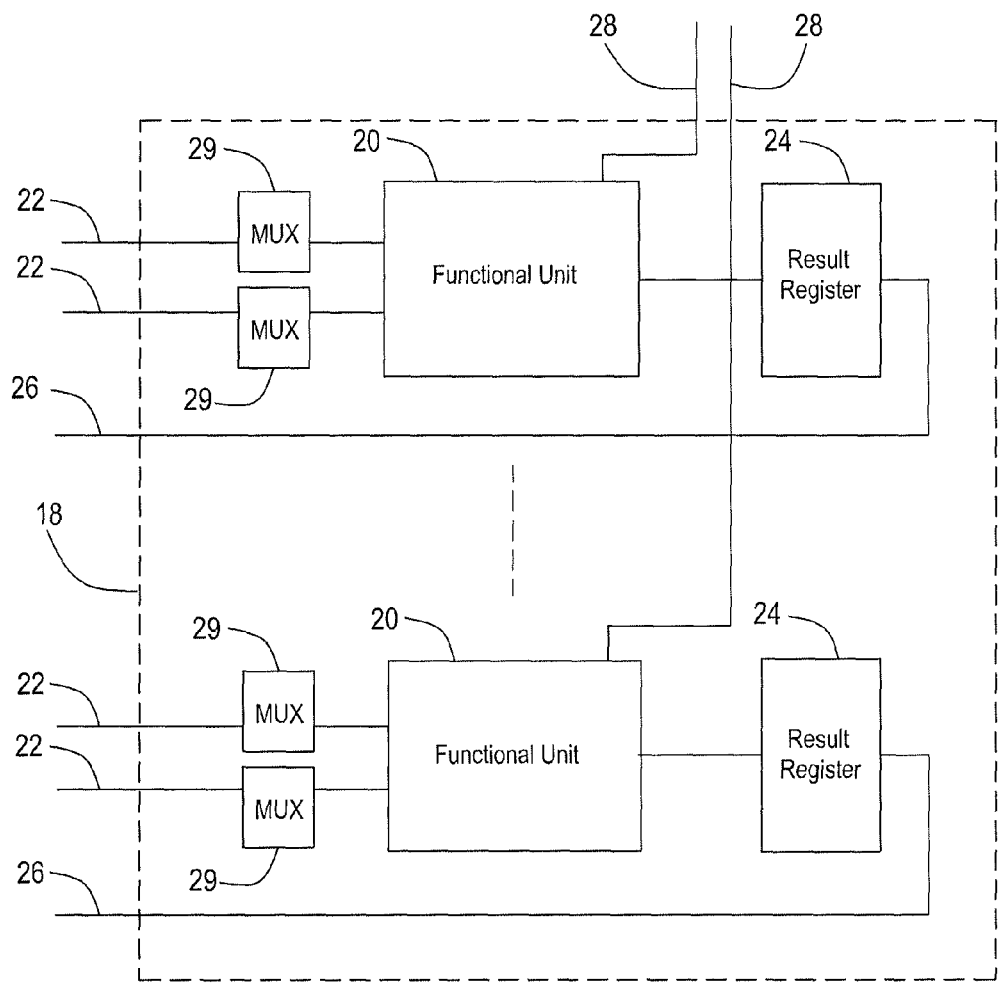

FIG. 2a shows an embodiment of execution unit 18 wherein multiplexers 29 are provided for selecting between operands from read ports of the register files (not shown) and (optionally selectable) internal result registers 24 of the execution unit 18. Multiplexers 29 are controlled from the instruction decoder. This renders possible a concatenation of operations without storage of intermediate results into a register file.

In an embodiment, operand registers may also be provided at the inputs of functional unit groups 20 for temporary storage of operands from register files and/or result registers. This makes it possible to execute loading of operands and performing the operations using the operands in different instruction cycles.

In an embodiment, the instruction from instruction register 16 contains a plurality of fields, each comprising one or more bit positions. The contents of part of the fields indicate operations to be performed by execution unit 18 and the contents of another part of the fields indicate register addresses in set of register files 19, from which operand data have to be supplied to read ports or into which results have to be stored from write ports. In this embodiment, the mode control signal is used to determine which parts of the instruction serve as fields indicating operations and which parts of the instruction serve as fields indicating register addresses and/or the size of these parts.

Figure 3:
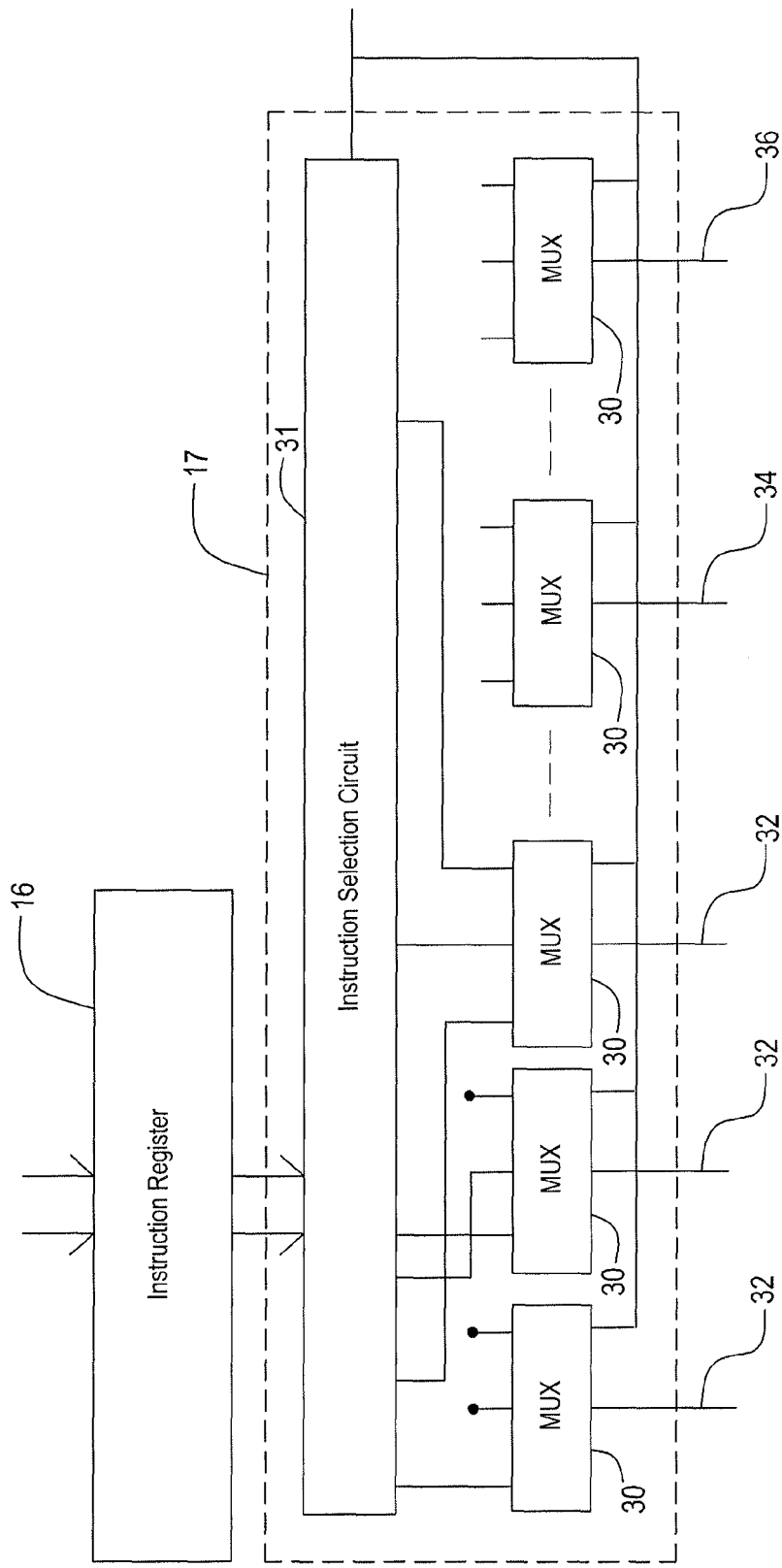
FIG. 3 shows an instruction decoder.

FIG. 3 shows an embodiment of instruction decoder 17. In this embodiment, instruction decoder 17 comprises an instruction selection circuit 31 with a multi-bit input coupled to instruction register 16, and a plurality of multiplexers 30 with inputs coupled to different parts of the output of instruction selection circuit 31. In addition, default signal supply conductors may be coupled to selected inputs of multiplexers 30. A first part of multiplexers 30 has first outputs 32 coupled to the control inputs of functional unit groups (not shown). A second part of multiplexers 30 has second outputs 34 coupled to read address inputs of read ports of the set of register files (not shown). A third part of multiplexers 30 has third outputs 36 coupled to write address inputs of write ports of the set of register files (not shown).

Instruction selection circuit 31 has control inputs coupled to sequencer 10 and to mode control circuit 12. When the instruction mode selected by mode control circuit 12 indicates that instructions occupy less than the full instruction register, instruction selection circuit 31 uses bits of the program counter value from sequencer to select a position in the instruction register from which to supply the instruction. For example, if the instruction mode indicates that half-size instructions are used, a bit of the program counter value controls whether a first or a second half of the content of instruction register is supplied. As another example, if the instruction mode indicates that quarter-size instructions are used, bits of the program counter value control whether a first, second, third, or fourth successive quarter of the content of instruction register is supplied.

Multiplexers 30 have control inputs coupled to mode control circuit 12. Depending on the instruction mode selected by mode control circuit 12, multiplexers 30 supply bits from different positions in the instruction and/or default bits to first, second, and third outputs.

In an embodiment, instruction decoder 17 routes the bits of the fields from the instruction to execution unit 18 and set of register files 19 in accordance with the instruction mode selected from mode control circuit 12 by the mode control signal. It should be noted that fields indicating register addresses are routed separately from fields indicating operations that produce the results. Thus, a field from a current instruction for indicating a write address for writing a result is used to address a register for writing a result of execution of an operation that was indicated by a preceding instruction. The result of this preceding instruction is available in a result register 24 when the current instruction is being executed, i.e. while one or more operations selected by the current instruction are being executed.

Thus, operation selection codes and register addresses for writing results of these operations are supplied from different instructions, supplied in different instruction cycles. In an embodiment, operations indicated by the current instruction are applied to operands fetched from registers addressed under the control of fields in the current instruction, but alternatively the operations may be applied to operands fetched from registers addressed under the control of fields in a preceding instruction. In this case operation selection codes and register addresses for fetching operands for these operations are also supplied from different instructions, and in different instruction cycles.

In the further embodiment wherein the execution unit contains internal registers that may receive results from functional units, operation codes may also indicate operations to be applied to the contents of such internal registers by the functional units. Thus, operation selection codes for performing successive stages of a compound operation may be supplied from different instructions, and in different instruction cycles.

Instruction decoder 17 may support a first instruction mode, for example wherein a plurality of fields in an instruction indicate a plurality of operations that have to be executed in parallel by different functional units (not shown) in execution unit 18. Also in the first instruction mode, another plurality of fields of the instruction may indicate addresses of registers for supplying operands for the instructions. A further plurality of fields of the instruction may indicate addresses of registers for writing results of the operations from an earlier instruction or earlier instructions. In addition to the first instruction mode, instruction decoder 17 may support a second instruction mode wherein only one field is defined for selecting one operation (or one predetermined combination of operations), only two fields are defined for indicating addresses of registers for fetching operands, and only one field is defined for indicating an address for writing a results. Furthermore, or alternatively, another instruction mode may provide that fields indicate more than one operation, but fewer operations than in the first mode, more than two register addresses for fetching operands, and more than one register address for writing results.

Also, the number of bits in different fields of the instruction may be different in different instruction modes. For example, in one instruction mode the number of bits in fields for selecting register addresses may be greater than the number of bits in fields for selecting register addresses in another instruction mode. Thus a greater number of registers can be addressed in said one mode than in the other instruction mode. For example, only a subset of the addresses that can be addressed in said one mode may be addressable in the other mode. In another example, different, disjoint sets of registers may be addressable in said one mode and the other mode, or partly overlapping sets.

Similarly, in one instruction mode the number of bits in fields for selecting an operation may be greater than the number of bits in fields for selecting operations in another instruction mode. Thus a greater number of operations can be selected, in said one mode than in the other instruction mode.

For example, only a subset of the operations that can be selected in said one mode may be selectable in the other mode. In another example, different, disjoint sets of operations may be selectable in said one mode and the other mode, or partly overlapping sets.

It should be appreciated that not all bits from instruction register 16 need be used to indicate operations, operand register addresses, and result register addresses. Part of the bits from instruction register 16 may be left unused in at least part of the instruction modes. Thus, shorter instructions can be used in these instruction modes.

Figure 4:
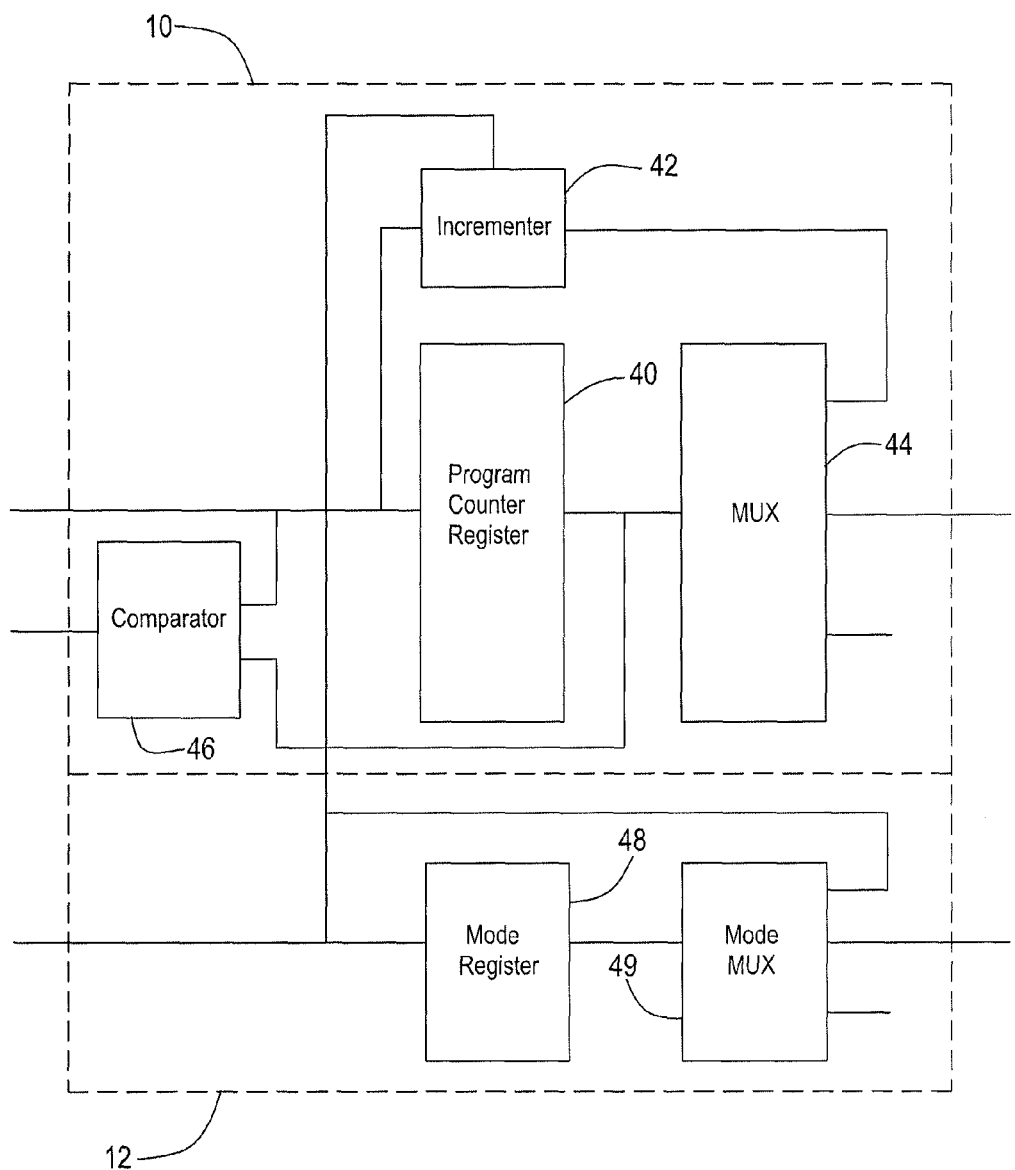
FIGS. 4, 4a show sequencer and mode control circuits.

FIG. 4 shows an embodiment of sequencer 10 and mode control circuit 12. In this embodiment, sequencer 10 contains a program counter register 40, an incrementer 42, a multiplexer 44 and a comparator 46. Program counter register 40 has an output coupled to an address input of the program memory (not shown) and to incrementer 42. Incrementer 42 has a control input coupled to mode control circuit 12. Multiplexer 44 has inputs coupled to an output of incrementer 42, to a jump address output of the execution unit (not shown), and to? a start address source (not shown). In addition or alternatively, multiplexer 44 may have an input coupled to a return address source (not shown) for returning from subroutines. Multiplexer 44 has a control input coupled to the execution unit (not shown). Multiplexer 44 has an output coupled to an input of program counter register 40. Comparator 46 has inputs coupled to the outputs of multiplexer 44 and program counter register 40 and an output coupled to an enable input of the instruction memory (not shown).

Mode control circuit 12 contains a mode register 48 and a mode multiplexer 49. Mode multiplexer 49 has inputs coupled to an output mode register 48, to a mode part output of the execution unit (not shown) that accompanies the jump address output, and to a start mode source (not shown). Mode multiplexer 49 has a control input coupled to the execution unit (not shown). Mode multiplexer 44 has an output coupled to an input of mode register 48.

In operation, program counter register 40 loads an address from multiplexer 44 in each execution cycle. The execution unit controls the source of the address. Initially, a start address is loaded. Subsequently, a result of incrementing the previous program counter value is normally loaded, but if the execution unit signals a successful branch instruction, a branch target address supplied from the execution unit is loaded. In this embodiment the increment of the program counter depends on the selected mode. For example, if instruction modes with full-size, half-size, and quarter-size instructions are used, the program counter value is incremented by four, two, or one when the full-size, half-size and quarter-size instruction mode is indicated, respectively. Preferably, the instruction memory is capable of loading full-size instruction. In this case the least significant bit bits of the program counter value, which distinguish between less than full-size instructions, are not needed for addressing the instruction memory. Comparator 46, which is optional, compares the parts of the current and future program counter values that are needed for addressing the instruction memory and signals a read enable signal if the two are different.

Figure 4A:
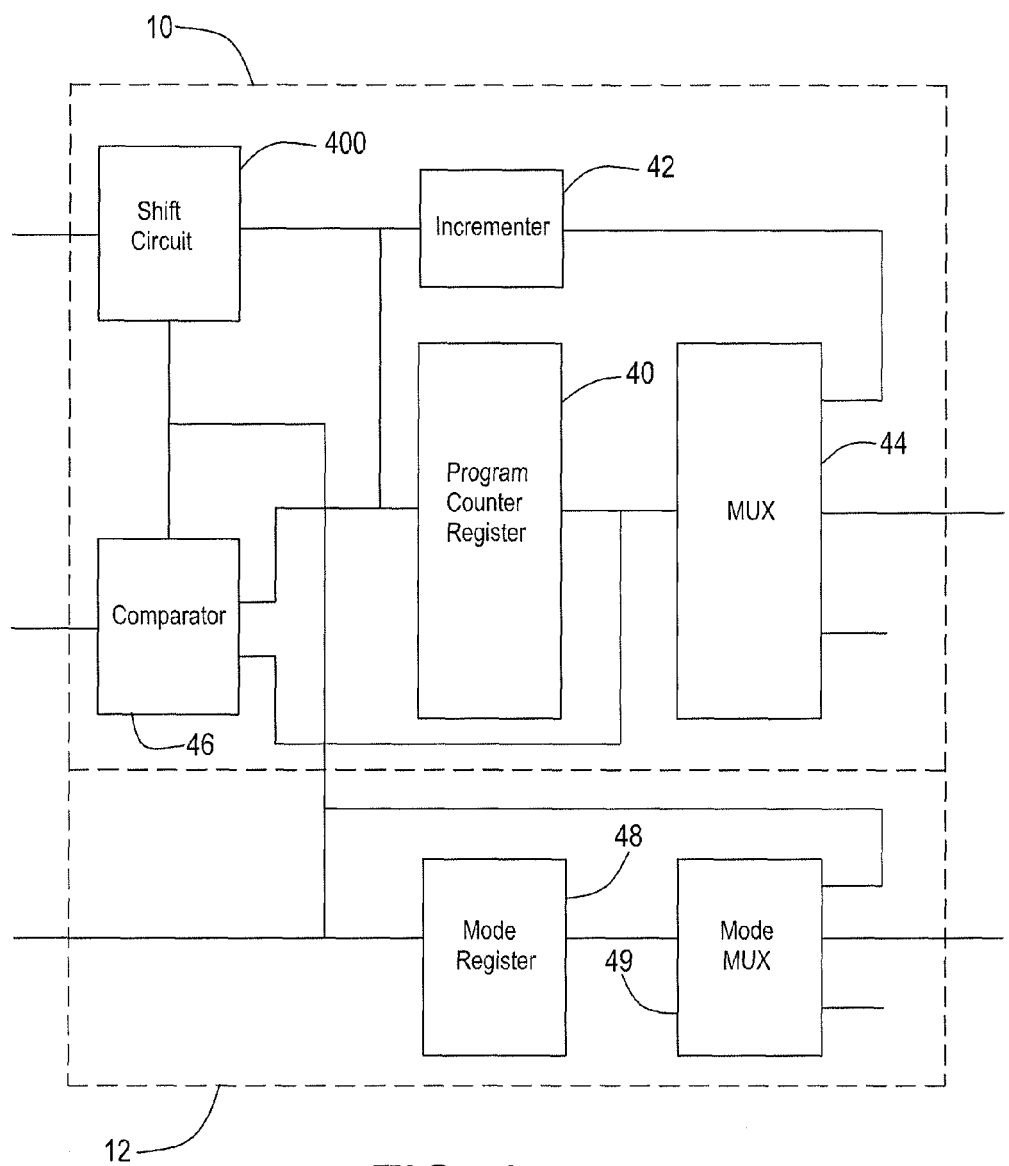

FIG. 4*a* shows an alternative embodiment wherein fixed, instruction mode independent increments are used (for example an increment of one). In this alternative embodiment, a shift circuit 400 is provided to shift the program counter value by a mode-dependent amount before applying it to the instruction memory. The comparator 46 is modified correspondingly for comparing only the parts of the addresses that are used to address the instruction memory in the current mode. It should be appreciated that this alternative embodiment makes more efficient use of program counter bits in the sense that no least significant bits are useless, because they need to have predetermined values in certain modes.

Operation of mode control circuit 12 is similar to that of sequencer 10. A mode value is loaded into mode register 48 in each instruction cycle. The execution unit controls the source of the address. Initially, a start mode is loaded. Subsequently, the mode value is normally unchanged (e.g. loaded from mode register 48), but if the execution unit signals a successful branch instruction, a mode value that accompanies the jump target address supplied from the execution unit is loaded. Preferably, jump target mode values are specified in combination with jump target addresses (in the form of absolute addresses or relative addresses) in jump instructions, for example as literal data that form part of the instruction.

In an embodiment, the positions for a predetermined number of most significant bits of the jump target address may be used for this, so that the most significant bits of the jump target address are mode bits. In jump instructions with absolute addresses, these most significant bits are copied to mode register 48 upon execution of the jump instruction. In an embodiment wherein the circuit supports jump instructions (which will also be termed branch instructions) with relative addresses (i.e. offset with respect to a program counter address), the less significant bits of the relative address of a successful jump instruction are added to a program counter address in order to obtain a new program counter address, and the most significant bits may be handled independently to load mode register 48, any overflow from the less significant bits into the mode bits being disabled.

In an embodiment, sequencer 10 provides an execution of "jump to subroutine" and "return from subroutine" instructions and/or register-based jump target addressing. When a jump to a subroutine is performed, the current incremented program counter value is saved when the jump is performed. Later on, when the "return from subroutine" instruction is performed, this program counter value is loaded into program counter register. In this embodiment the mode control value is also stored in response to the jump to subroutine instruction and restored in response to the return from subroutine instruction. Similarly. if any jump target address is provided from a register, mode bits may be loaded from that register as well.

It should be appreciated that the number of different modes that can be selected in this way depends on the number of mode bits that are used for this purpose. Different modes may provide instructions of different length. In an embodiment, however, a plurality of different ones of the modes may provide instructions of the same length, the most significant bits of the jump target address being used to select between these modes.

It should be appreciated that this use of jump instructions to switch between different instruction modes may also be applied to processors wherein the operation selection code, the result register address, and the operand register addresses for an operation are each contained in the same instruction (i.e. so that pipelining is required to be able to use these parts of the instruction in different instruction cycles). In such processors, instruction size can be typically reduced more effectively by including an indication in each instruction for which the groups of functional units instruction information is included?, so that NOPs (no operation instructions) can be automatically generated for the other groups of functional units. However, it has been found that the use of such indications becomes very inefficient for processors wherein at least two of the operation selection code, the result register address, and the operand register addresses for an operation are included in mutually different instructions:

It should be appreciated that other mechanisms may be used for mode selection. For example, mode selection bits may be part of each instruction or part of the instruction, for example, that indicates the instruction mode of the next instruction or instructions. In this case these bits are supplied to the mode control circuit. This has the advantage that it provides a detailed control over the mode, but it has the disadvantage that instruction size becomes larger, whereby the efficiency of memory use is reduced. In another embodiment, only every last instruction in the space for a full-size instruction word contains such mode selection bits (e.g. only the second instruction of two half-size instructions). This is more memory efficient. Use of jump instructions for mode selection has the advantage that it reduces the code size.

As another example, special mode change instructions may be used, the execution unit controlling the mode control circuit to load a mode value under the control of information from these mode change instructions. The mode change instruction may contain data, for example, to indicate the new mode, or a predetermined sequence of instruction modes may be defined, the mode change instruction commanding a step to the instruction mode that follows the current instruction mode in this predefined sequence. The use of mode change instructions may reduce code size in comparison with bigger jump instructions, but when mode changes frequently accompany jumps, jump instructions may result in smaller code size.

As will be appreciated, the data processing circuit described above uses instructions that may specify stages of processing of different operations in one instruction. Thus, for example, the operation selection code of a first operation may be accompanied in the same instruction by the write register address for the write back stage of a second operation, for which the operation selection code was supplied in a previous instruction. Also, a plurality of operation selection codes for different functional units may be supplied in the same instruction and/or a plurality of write register addresses for different operations for which the operation selection codes were supplied in a previous instruction or previous instructions. Furthermore, operand register addresses may be supplied in the instruction for the operation or operations that are selected in the instruction and/or previous instructions. Literal data may also be supplied in the instruction for the operation or operations that are selected in the instruction.

In an embodiment, the number of operations and/or the number of register addresses specified in an instruction depends on the selected instruction mode. In an embodiment, the number of register addresses supplied in the instruction is proportional to the number of operations. Thus, for example, the number of write register addresses is equal to the number of operation selection codes and/or the number of operand register addresses may be equal to twice the number of operation selection codes (depending on the instruction mode).

Alternatively, however, instruction modes without such a proportional relation may be defined. For example, in one or more instruction modes the number of write register addresses may be greater than the number of operation selection codes. This may be used, for example, when different operations have different latencies, to avoid that operations cannot be scheduled due to a lack of capacity to specify write addresses in the instruction cycle wherein the operations deliver results. Furthermore, it may be used to define transition modes to which the circuit can be switched between a wider instruction mode and a narrower instruction mode, in order to handle results of operations that were started in the wider instruction mode.

As another example, the number of write register addresses may be smaller than the number of operation selection codes in one or more instruction modes. This may be used, for example, when different operations have different latencies, to exploit the possibility of starting a plurality of operations in parallel whose results will be written back in different instruction cycles. As another example, furthermore, it may be used for program parts wherein different operations are concatenated without writing an intermediate result to a register in a register file. In this case no write address needs to be provided for operations that produce such intermediate results. Instructions with fewer write addresses can thus be used in instruction modes that support this type of execution. As a further example, fewer write addresses may be used in transition modes to which the circuit can be switched between a narrower instruction mode and a wider instruction mode, in order to be able to start more operations whose results will be written in the wider instruction mode.

Apart from rendering possible a specification of a different number of write register addresses and/or operand register addresses, different instruction modes may also provide different specification sizes of register addresses. Thus, for example, in a first instruction mode four bit register addresses may be used in the instructions, each specifying one of sixteen registers, whereas in a second instruction mode six bit register addresses may be used, each specifying one of sixty-four registers. In one embodiment, a first instruction mode allows addressing of only a subset of the registers that can be addressed in the second instruction mode.

In one embodiment. it is avoided that programs for the circuit cause any operation to be started while operating in one mode and the result of that operation to be written while operating in another mode. That is, during program compilation it is avoided that operations are scheduled such that their result is produced after the point where subsequently a branch will be taken (a branch is said to be taken when the program counter address changes; typically this is one or more instruction cycles later than the instruction cycle wherein the branch instruction is applied to the execution unit). It is similarly avoided in this type of embodiment that programs for the circuit cause any operation to be started while operating in one mode using operands from registers that were addressed to retrieve the operand in another mode.

In another embodiment, however, no such limitation may be imposed. For example, a mode transition may be used to provide a wider range of result register addresses for an operation than is possible within the instruction that selects the operation. In this case, a program has a first instruction containing an operation selection code for the operation, a second instruction containing a result register address for the operation, and an instruction to change the instruction mode, so that the first instruction is executed in a first instruction mode and the second instruction is executed in a second instruction mode, the second instruction mode allowing addressing of registers that cannot be addressed in the first instruction mode.

In another embodiment, different modes provide selection from different sets of specialized operations, but not necessarily different numbers of operation selections and/or register selections in different instruction modes. In one embodiment, for example, different instruction modes for one or more of image compression, image decompression, audio compression, audio decompression, and computer graphics processing may be provided. Specialized operations, typically supported by dedicated hardware, may be defined for each of these modes, such as a block matching operation for image compression, DCT transform instructions for image compression and decompression, texture mapping or bit blitting operations for computer graphics processing, variable-length compression/decompression operations, etc. Different instruction modes provide the selection of operations from respective different subsets of these operations.

Figure 5:
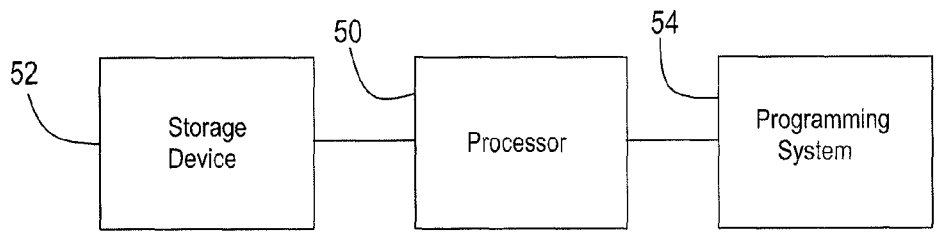
FIG. 5 shows a programming system.

FIG. 5 shows a program development system. The system comprises a processor 50 that is programmed to execute a compiler program, a source code storage device 52, and a programming system 54 to program compiled code into instruction memories. If a programmable non-volatile memory is used for the instruction memory or part of it (e.g. a flash memory), programming system 54 may make use of a non-volatile memory programming circuit. Such a circuit may be used off-line to program a plurality of instruction memories. Alternative forms of programming may be used, however, such as mask programming of integrated circuits.

Figure 6:
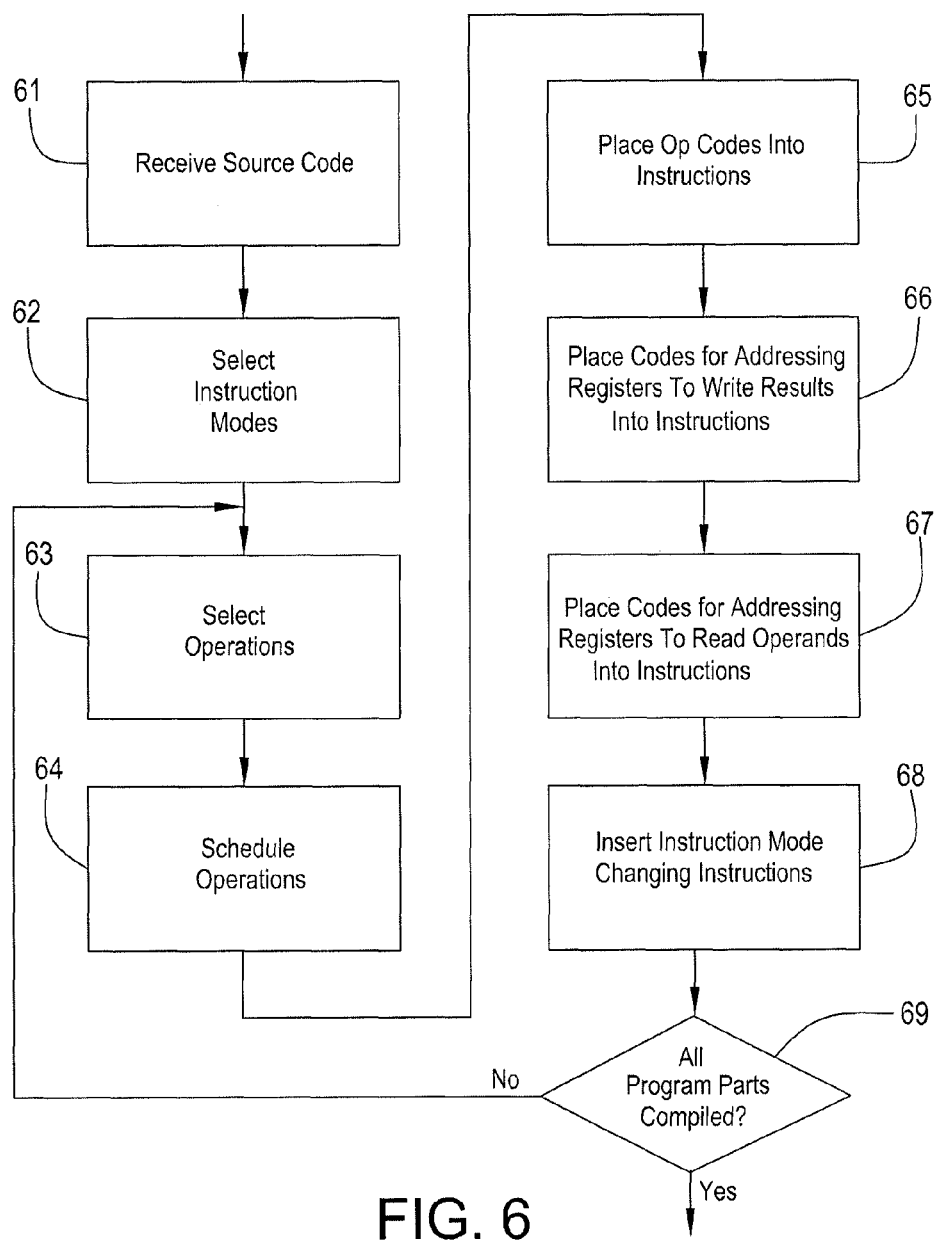
FIG. 6 is a flowchart of the compiling procedure.

FIG. 6 illustrates the operation of the compiler. In a first step 61, the compiler receives a source code, for example in a high level language such as C or C++, or in an intermediate language. In a second step 62, the compiler selects instruction modes for respective parts of the program. This may be done, for example, on the basis of explicitly programmed mode selections or on the basis of profiling data obtained by executing a provisionally compiled version of the program, frequently executed parts of the program being assigned an instruction mode with wider instructions and less frequently executed program parts being assigned an instruction mode with narrower instructions. In another embodiment, wherein different instruction modes support different types of tasks (e.g. image compression, image decompression, computer graphics, audio compression, audio decompression etc.), different instruction modes may be assigned to different program parts according to the task performed in the part.

Subsequently, the compiler compiles the program parts of the source code. Basically, each part is compiled targeted at a different notional processor defined by the instruction mode that has been assigned to the program part. In a third step 63, the compiler selects operations for implementing the source code in a program part from instructions that are available in the instruction mode assigned to the program part. A fourth step 64 schedules the operations and register read and write actions for the operations, that is, it assigns instruction cycles to the execution of the operations and register read and write actions for the operations. Scheduling techniques are known per se. In an embodiment, scheduling is performed by stepping to successive instructions and, for each instruction, searching for operations that can be scheduled in the instruction in view of data dependencies and allocating registers to store results for later use as operands for other operations. Backtracking may be used if constraints on the availability of space in the instructions for writing results or on the availability of registers are not met. A schedule that minimizes execution time may be selected.

In a fifth step 65, the compiler places operation codes for selecting the operations in the instructions. In a sixth step 66, the compiler places codes for addressing registers to write results to registers in the instructions. Typically, the instructions in which the codes for addressing registers are placed are selected in dependence on the instructions in which the operation codes are executed, by adding a delay required for executing the instruction. In a seventh step 67, the compiler places codes for addressing registers to read operands from registers in the instructions. In an embodiment, these codes are placed in the same instruction in which the operation selection code is placed. In an alternative embodiment, wherein buffering of operand data is supported, or wherein operands need to be addressed before issuing the operation code, these operand selection codes and operation selection codes may be placed in mutually different instructions. Optionally the instructions for placing register addressing code are selected in dependence on the availability of space in the instructions.

In an eighth step 68, the compiler inserts instruction mode changing instructions (e.g. jump instructions) at transitions between program parts that are executed with different instruction sets and in jump instructions from one program part to another. In a ninth step 69, the compiler tests whether all program parts have been compiled and, if not, jumps back to the third step 63 for another program part.

In an embodiment, the compiler imposes a constraint on scheduling operations relative to jump (branch) instructions. In particular, the constraint requires that no operation may be scheduled before the jump (branch) is taken if the result of the operation will become available after the jump (branch) is taken. Similarly, if operands addressing for an operation and operation code selection for that operation are included in different instructions, a constraint may be imposed that no operation may be scheduled so closely after a jump (branch) is taken that the operands of the operation must be addresses before the jump (branch) is taken. In this way, conventional single mode scheduling can be used once an operation is assigned to a mode: operation selection. Loading of operands and writing of results for the operation are all performed in the selected mode.

Table I shows an example of a part of a program that may be obtained in this way.

TABLE I

| Field1 | Field2 | Field3 | Field4 | Field5 | Field6 | Field7 | Field8 |
| --- | --- | --- | --- | --- | --- | --- | --- |
| OP1 | A11 | A12 | R11 | OP2 | A13 | A14 | R12 |
| JMP | 1100000000 |  | R21 | OP3 | A23 | A24 | R22 |
| NOP | x | x | x | NOP | x | x | R32 |
| OP4 | A31 | A32 | x |  |  |  |  |

Each row show a different instruction, and different columns show different fields in the instructions. The instructions of successive rows are executed successively. OP1, OP2, OP3, OP4 and JMP are operation register selection codes. A11, A12, A13, A14, A23, A24, A31, A41 are operand selection codes. R11, R12, R22 and R32 are result register selection codes. It is assumed in the example that the selected operations have one cycle latency. R21 selects a result register for the operation selected by OP1, R22 selects a result register for the operation selected by OP2, R32 selects a result register for the operation selected by OP3. R11 and R12 select result registers for previously selected operations (not shown).

The jump operation selection JMP in the second instruction controls an instruction mode switch which takes effect with a one-instruction latency, i.e. starting from the fourth instruction. It is assumed that a first instruction mode before the mode switch has eight field instructions and a second instruction mode after the mode switch has four field instructions (although the fields are shown in vertical columns for the sake of simplicity, in practice the fields in the first and second mode may have mutually different sizes). It is to be noted that the jump instruction uses a field for the jump address that has a size that is a plurality of the field sizes for specifying registers. These fields are routed to the sequencer for handling the jump.

It is assumed in the example that the selected operations have one cycle latency. Accordingly no operation selections (NOPs) are scheduled in the last instruction before the mode change takes effect. This instruction only contains a result register selection for operation OP3 behind the jump command. Thus, the jump delay is used to provide a field for writing a result.

It is assumed that operation register selection codes. A11, A12, A13, A14, A23, A24, A31, A41 serve for the operation selected in the same instruction in which these selection codes are included. However, it should be appreciated that in an alternative embodiment such selection codes may need to be provided in earlier instructions. In an embodiment with long latency operations they may also be included in later instructions. Although an example has been used wherein each operation has one cycle latency, it should be appreciated that in practice a different latency may be used, or that different operations have mutually different latencies. In this case the result register selection codes are placed in correspondingly offset instructions. In some cases the result register selection codes may be placed even later than the instruction in which a result is first produced, making use of buffering in the functional unit to delay writing.

In an another embodiment, the compiler imposes no such "single mode" constraint on at least part of the operations. Thus, for example, a code to select an operation may be included, in an instruction that is executed in one mode and a code to address a register for writing the result of the operation may be included in an instruction that is executed in another mode and/or a code to address a register for reading an operand of the operation may be included in an instruction that is executed in another mode. Table II shows an example of a part of a resulting program.

TABLE II

| Field1 | Field2 | Field3 | Field4 | Field5 | Field6 | Field7 | Field8 |
|---|---|---|---|---|---|---|---|
| OP1 | A11 | A12 | R11 | OP2 | A13 | A14 | R12 |
| JMP | 1100000000 |  | R21 | OP3 | A23 | A24 | R22 |
| OP4 | A31 | A32x | x | NOP | x | x | R32 |
| OP5 | A41 | A42 | R41 |  |  |  |  |

Herein it is assumed that the instruction mode change from a first to a second instruction mode (caused by the JMP operation) takes effect at the fourth instruction (fourth row), the instruction of the fourth row being executed in the second instruction mode. The third instruction, which is executed while the first instruction mode still applies, contains an operation selection OP4 of an operation that is assumed to produce a result that can be written at the time of execution of the fourth instruction. This fourth instruction accordingly contains a field with a selection code R41 to select a destination register for the result of the operation selected by OP4.

This is done, for example, if the jump instruction that controls switching between the modes is included only to control the mode switch (i.e. if the program provides only one way of reaching the jump target). In this case it is uniquely known which operations will have been started before the jump instruction, and there is no problem in scheduling an inclusion of result register addresses for these operations in the instructions after the jump target. In this case the compiler may be arranged to operate without such constraints. This removes constraints that could reduce execution speed or code size. Moreover, in this case the mode switch may be also used to provide writing to result registers that were not available in the mode that applied before the jump was taken. The same goes for scheduling inclusion of operand register addresses for operations for which the operation code is selected behind a jump target.

In an embodiment, the compiler generates a list of results of operations for which the results have yet to be written after the end of the instructions implementing the operations for a program part. Indications of instruction cycles in which these results will become available may be added to this list. This list is passed to the third step 63 to enable the compiler to include destination addresses for these results in the instructions for a next program part, which is compiled for a different instruction mode. In executing the scheduling step (fourth step 64) the compiler selects instructions for the results on the list.

In an embodiment, special attention is paid to instructions shortly before and shortly after transition points in the program, where instruction mode changes occur. In the third step 63 in this embodiment, the compiler constrains a search for operation codes for placement in instructions in a first instruction mode within a predetermined distance before a transition point, the selection being constrained by the availability of space in instructions or the availability of addressable "free" registers for a second instruction mode that applies after the transition point. Thus, for example, the compiler will impose less restrictive constraints of such a type on instructions within a predetermined distance prior to the transition point if the second instruction mode provides more result register addresses or a larger set of addressable registers. In another example, the compiler will impose more restrictive constraints of such a type on instructions within a predetermined distance prior to the transition point if the second instruction mode provides fewer result register addresses or a smaller set of addressable registers.

In another example, the single mode constraint can be relaxed by using a standard convention for starting operations prior to taking a jump instruction. In the case of a return from a subroutine, for example, a standard convention may be that an operation leading to a subroutine result is started with a predetermined offset with respect to the branch corresponding to the return from the subroutine. In this case the calling code to which the control returns may contain a selection of an address of a result register for the subroutine result. This increases register use efficiency because no standard subroutine result register needs to be reserved. More generally, if a jump target can be reached from different parts of a program, a convention may be used that all these parts start operations that produce a result in a same instruction cycle relative to the instruction cycle in which the branch is taken. In this case the target part of the program may contain an instruction to select a result register address. Accordingly the compiler can be arranged to impose lesser constraints on scheduling. Moreover, this allows addressing of a result register and operation code selection in different modes. The same goes for scheduling an inclusion of operand register addresses for operations for which the operation code is selected after taking a jump to a subroutine instruction. In this way subroutine arguments can be passed without reserving argument registers.

In an embodiment, the compiler is configured to schedule selection of an operation that generates a subroutine result at a first predetermined position relative to a return from the relevant subroutine instruction and to schedule addressing of a result register address at a second predetermined position relative to a jump to said subroutine instruction, the first and second positions being selected such that the result of the operation is available for use with the addressed result register. The compiler may even be arranged to use different sets of such predetermined positions for different subroutines. Similar sets of predetermined positions may be used for addressing operand registers before taking a jump to the subroutine instruction and selection of operations in the subroutine.

In another embodiment, the compiler is also configured to schedule concatenated operations that pass results from one to the other without requiring writing or reading of intermediate results to a register file. In this case the compiler will impose additional constraints in order to avoid that other instructions are scheduled between concatenated instructions in a way that disturbs concatenation. In this case less register addressing needs to be scheduled, so that no unnecessary result write actions need to be performed.

The invention claimed is:

1. A data processing circuit comprising:
a set of registers;
an execution circuit coupled to the set of registers;
an instruction decoder coupled to the execution circuit and configured to use time-stationary decoding of selection of operations to be executed by the execution circuit and selection of destination registers from the set of registers for writing results of the operations upon generation of the results by the execution unit, the instruction decoder being operable in at least a first instruction mode and a second instruction mode, instructions for execution in the first and second instruction mode leading to mutually different numbers of addressable destination registers; and
a mode control circuit coupled to the instruction decoder, the mode control circuit being configured to control switching between the first and second instruction modes in response to instructions during program execution.

2. A data processing circuit according to claim 1, comprising an instruction memory programmed with a program comprising switch instructions to affect switches between the first and second instruction modes, each switch instruction defining a border between a first part and a second part of the program executed before and after the switch instruction has been executed, respectively, the first part of the program containing an instruction that selects an operation whose result is written into a destination register selected by an instruction from the corresponding second part of the program.

3. A data processing circuit according to claim 1, comprising an instruction memory programmed with a program comprising a first instruction for execution in the first instruction mode, including a first field for selection of an operation, and a second instruction for execution in the second instruction mode, the second instruction including a second field for selecting a destination register for writing the result of the operation selected by the first instruction upon generation of its result.

4. A data processing circuit according to claim 3, wherein the mode control circuit is configured to control selection between the instruction modes for instructions executed following a jump command from the program in response to instruction mode selection information provided by execution of the jump command, the first and second instruction being located before and after a point in the program where the jump command is taken, respectively.

5. A data processing circuit according to claim 4 wherein a target of the jump command in the program can be reached in the program flow exclusively via the jump command.

6. A data processing circuit according to claim 1, wherein the execution unit comprises a plurality of functional units, the instruction decoder being configured to extract from each instruction for execution in the first instruction mode first fields for selecting destination register addresses for writing results from each of the respective functional units, upon generation of the results, the instruction decoder being configured to extract from each instruction for execution in the second instruction mode one third field or third fields for selecting a destination register address or destination register addresses for writing a result or results from no more than a subset of the respective functional units, upon generation of the result or results.

7. A data processing circuit according to claim 1, wherein the instruction decoder is configured to extract first and second fields for selecting destination register addresses from instructions in the first and second instruction mode, respectively, the first and second fields providing a first and a second range of addressable registers, respectively, the first range containing registers not contained in the second range.

8. A method of scheduling operations for a programmable data processor that is operable to execute programs under the control of time-stationary instructions in a plurality of different instruction modes, each instruction mode defining a respective assignment of fields of instructions to selection of operations and selection of result registers, the method comprising:
receiving an input program defining operations;
assigning instruction modes to respective parts of the input program;
assigning result registers to the operations that arise from the input program;
assigning operations arising from the input program to sequential instruction locations in a target program, under a constraint that operations from each selected part are assigned to a respective range of instruction locations, the respective ranges for different parts having no mutual overlap;
inserting operation selection codes for selecting the operations each into a first field of a respective instruction at the assigned location for the operation;
inserting mode change commands into instructions of the target program located such that the mode change commands take effect at borders between the ranges; and
inserting result register address selection codes into second fields of the instructions of the target program at offsets relative to the instructions into which corresponding selection codes are inserted, the offsets corresponding to a number of instruction cycles needed for generating a result with the operation selected by the corresponding selection code.

9. A method of scheduling operations according to claim 8, wherein the data processor defines respective latency intervals between the taking into execution of each mode change command and the taking effect of the mode change, the method comprising inserting at least one of the result register address selection codes into at least one of the latency intervals, the register address selection code in the instruction in said latency interval being inserted in conformance with the instruction mode that applied before the mode change effected by the mode change command.

10. A method of scheduling operations according to claim 9, wherein the mode change commands are jump commands that contain information indicating the instruction mode that applies to instructions executed after taking the jump, the method further comprising:

imposing a further constraint upon assignment of operations to instruction locations that operation selection codes of operations that generate results used by the program are all inserted at least a predetermined distance before the borders, the predetermined distance having a value equal to the number of instruction cycles needed for generating a result with the operation selected by the corresponding selection code.

11. A method of scheduling operations according to claim 8, the method further comprising:

determining operations for which operation selection codes are inserted into the instructions at a lesser distance to said borders than said number of instruction cycles needed for generating a result with the operation, and inserting result register address selection codes for the operations into the second fields in a subsequent one of the ranges according to the instruction mode that applies across the borders.

12. A method of scheduling operations according to claim 11, wherein the mode change commands include jump commands that contain information indicating the instruction mode that applies to instructions executed after taking the jump, and wherein said determining of operations, for which operation selection codes are inserted into the instructions at a lesser distance to said borders than said number of instruction cycles, comprises determining whether a target of said jump command can be reached in the program flow exclusively via the jump command.

13. A method of scheduling operations according to claim 11, wherein the mode change commands include return from subroutine commands, and wherein said operations, for which operation selection codes are inserted into the instructions at a lesser distance to said borders than said number of instruction cycles, are operations that produce results of the subroutines for use by subroutine calling program parts, the result register address selection codes being inserted in the calling program parts.

14. A method of scheduling operations according to claim 8, the method comprising programming the target program into an instruction memory of the data processor.

15. A computer configured to schedule operations for a programmable data processor that is operable to execute programs under control of time-stationary instructions in a plurality of different instruction modes, each instruction mode defining a respective assignment of fields of instructions to selection of operations and selection of result registers, the computer comprising:

a processor for executing computer-executable instructions; and a non-transitory computer-readable medium comprising computer-executable instructions that, when executed by the processor, cause the computer to carry out steps comprising:

receiving an input program defining operations;

assigning instruction modes to respective parts of the input program;

assigning result registers to the operations that arise from the input program;

assigning operations arising from the input program to sequential instruction locations in a target program, under a constraint that operations from each selected part are assigned to a respective range of instruction locations, the respective ranges for different parts having no mutual overlap;

inserting operation selection codes for selecting the operations each into a first field of a respective instruction at the assigned location for the operation;

inserting mode change commands into instructions of the target program located such that the mode change commands take effect at borders between the ranges; and inserting result register address selection codes into second fields of the instructions of the target program at offsets relative to the instructions into which corresponding selection codes are inserted, the offsets corresponding to a number of instruction cycles needed for generating a result with the operation selected by the corresponding selection code.

16. A computer program product comprising instructions which, when executed by a programmable computer, cause the programmable computer to execute the method of claim 8.

* * * * *